United States Patent
Wang et al.

(10) Patent No.: US 8,144,318 B2
(45) Date of Patent: Mar. 27, 2012

(54) METHOD OF CALIBRATING SENSITIVITY GAIN

(75) Inventors: Chung-Chi Wang, Taipei (TW); Yi-Jian Lee, Taipei (TW)

(73) Assignee: Ability Enterprise Co., Ltd., Taipei (TW)

( * ) Notice: Subject to any disclaimer, the term of this patent is extended or adjusted under 35 U.S.C. 154(b) by 163 days.

(21) Appl. No.: 12/765,823

(22) Filed: Apr. 22, 2010

(65) Prior Publication Data

US 2011/0157583 A1 Jun. 30, 2011

(30) Foreign Application Priority Data

Dec. 24, 2009 (TW) .............................. 98144780 A

(51) Int. Cl.
*G01J 1/16* (2006.01)
*G01J 1/10* (2006.01)
*H04N 5/228* (2006.01)

(52) U.S. Cl. ................. 356/243.1; 356/222.1; 356/208.4

(58) Field of Classification Search ............... 356/243.1; 438/208.4, 208.12, 208.16, 222.1, 72, 79, 438/362, 231.3, 349; 369/52–55

See application file for complete search history.

(56) References Cited

U.S. PATENT DOCUMENTS

| | | | | |
|---|---|---|---|---|
| 6,075,563 | A * | 6/2000 | Hung | 348/223.1 |
| 7,239,342 | B2 * | 7/2007 | Kingetsu et al. | 348/208.4 |
| 7,301,568 | B2 * | 11/2007 | Smith et al. | 348/231.3 |
| 7,683,962 | B2 * | 3/2010 | Border et al. | 348/348 |
| 7,855,737 | B2 * | 12/2010 | Petrescu et al. | 348/239 |
| 8,027,563 | B2 * | 9/2011 | Shimada et al. | 386/241 |
| 2004/0165100 | A1 * | 8/2004 | Motta | 348/362 |
| 2006/0187313 | A1 * | 8/2006 | Pandit et al. | 348/222.1 |

* cited by examiner

*Primary Examiner* — Sang Nguyen
(74) *Attorney, Agent, or Firm* — Stout, Uxa, Buyan & Mullins, LLP

(57) ABSTRACT

The present invention is directed to a method of calibrating sensitivity gain. In a preview mode, an imaging device is calibrated by a standard light source, therefore obtaining standard sensitivity gain of the preview mode. In a capture mode, the imaging device is calibrated by the standard light source, therefore obtaining standard sensitivity gain of the capture mode. A gain ratio of the standard sensitivity gain of the capture mode to the standard sensitivity gain of the preview mode is determined, and is then used to deduce the exposure parameters of the capture mode according to the exposure parameters of the preview mode.

20 Claims, 2 Drawing Sheets

METHOD OF CALIBRATING SENSITIVITY GAIN

CROSS-REFERENCE TO RELATED APPLICATIONS

The entire contents of Taiwan Patent Application No. 098144780, filed on Dec. 24, 2009, from which this application claims priority, are incorporated herein by reference.

BACKGROUND OF THE INVENTION

1. Field of the Invention

The present invention generally relates to an imaging device, and more particularly to a method of calibrating sensitivity gain for the imaging device.

2. Description of the Prior Art

A digital camera usually deduces the exposure parameters such as aperture value and shutter value of a capture mode by setting fixed value according to the exposure parameters measured in a preview mode. However, because of the variations of optical elements (e.g., the lens), electronic components or photoelectric elements (e.g., charge coupled device (CCD)) among the digital cameras, the means of setting fixed value may not ideally deduce the suitable exposure parameters mentioned above. Furthermore, when using multi-production lines to manufacture the digital cameras, it may cause inconsistent and erroneous sensitivity due to different light sources or other factors.

A need has thus arisen to propose a novel calibration method for the imaging device to ensure that the imaging devices produced have highly-consistent sensitivity.

SUMMARY OF THE INVENTION

The embodiments of the present invention disclose a method of calibrating sensitivity gain suitably for calibrating sensitivity for an imaging device (such as a digital camera or a digital camcorder), for promoting the accuracy of sensitivity and ensuring the highly-consistent sensitivity of the imaging device.

According to one embodiment of the present invention, a standard light source is provided firstly. In a preview mode, an imaging device is calibrated by the standard light source, therefore obtaining standard sensitivity gain of the preview mode. In a capture mode, the imaging device is calibrated by the standard light source, therefore obtaining standard sensitivity gain of the capture mode. A gain ratio of the standard sensitivity gain of the capture mode to the standard sensitivity gain of the preview mode is determined, and is then used to deduce the exposure parameters of the capture mode according to the exposure parameters of the preview mode. In another embodiment, a preview mode lookup table (LUT) is further constructed to store plural standard sensitivity gains of the preview mode, and a capture mode lookup table is constructed to store plural standard sensitivity gains of the capture mode.

DETAILED DESCRIPTION OF THE INVENTION

Figure 1:
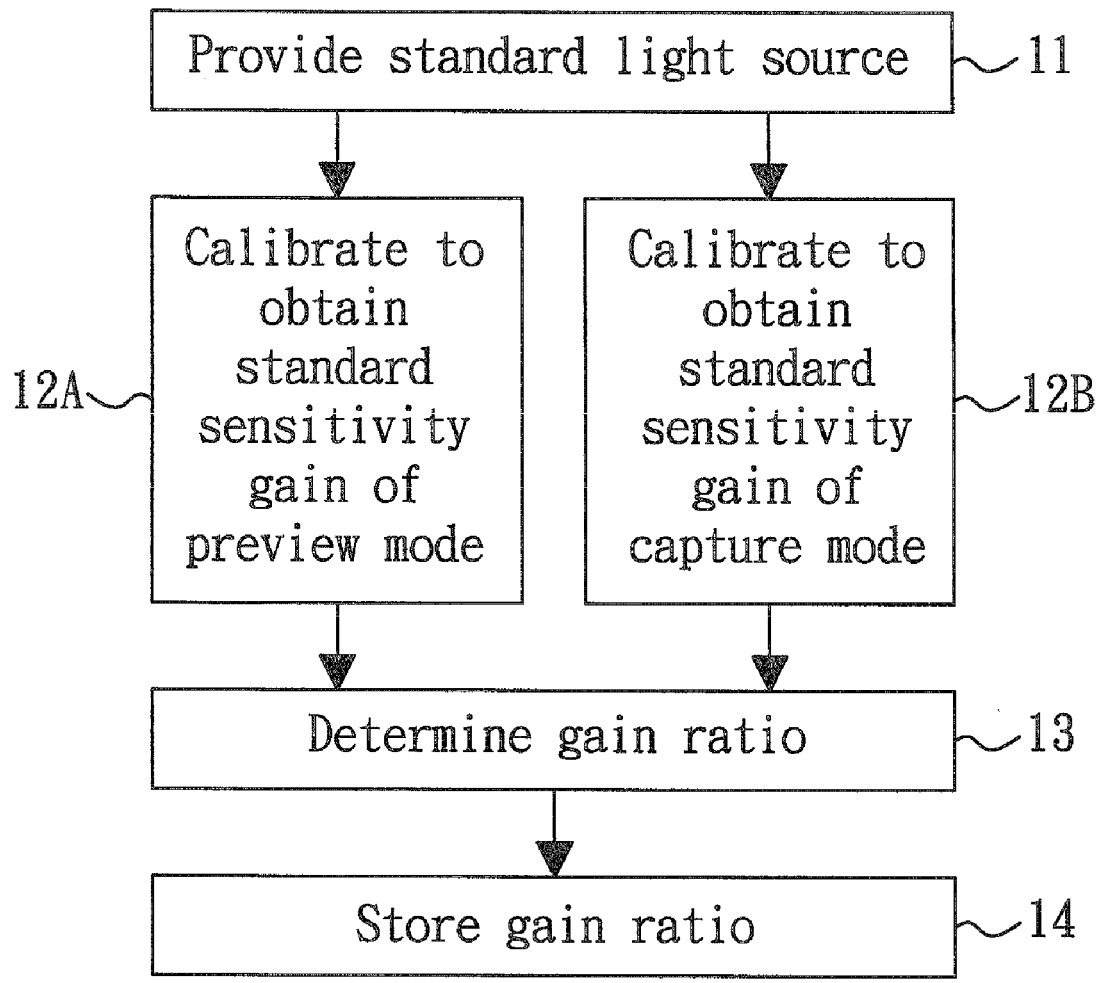
FIG. 1 is a flow diagram that illustrates a method of calibrating sensitivity gain according to one embodiment of the present invention.

FIG. 1 shows a flow diagram that illustrates a method of calibrating sensitivity gain according to one embodiment of the present invention. Firstly, a standard light source such as a standard light box is provided in step 11. The standard light source may be, but not limited to, the Commission internationale de l'éclairage (CIE) standard light source. For example, the standard light source series "D" of CIE standard represents the daylight.

Subsequently, in step 12A, in a preview mode, an imaging device is calibrated by a standard light source, therefore obtaining standard sensitivity gain of the preview mode. In the embodiment, an imaging device may be, but not limited to, a digital camera or a digital camcorder. The digital camera is aimed at the standard light source to perform calibrating of the preview mode, and as long as the shutter button of the digital camera is pressed halfway down, it may enter the preview mode. The sensitivity gain of the preview mode in the present specification is the gain, generated by the automatic gain control (AGC) electric circuit of the digital camera, which corresponds to one of the predetermined sensitivities (e.g., ISO 100) under the predetermined luminosity value (or luminance value) of the standard light source.

The calibration relations as mentioned above may be explained by the following exposure equation of the Additive system of Photographic Exposure (APEX). The term "Sv" represents the predetermined sensitivity (which is also called the speed value) and the term "Bv" represents the predetermined luminosity value of the standard light source. Accordingly, it will cause the imaging device to have a fixed exposure value Ev expressed as follows:

$$Ev=Bv+Sv \quad (1)$$

The exposure value Ev may determine the exposure parameters, that is, the aperture value Av and the shutter value Tv (which is also called the time value). It conforms to the equation as below:

$$Ev=Av+Tv \quad (2)$$

Combining equation (1) with (2) may obtain the equation (3) as below:

$$Ev=Bv+Sv=Av+Tv \quad (3)$$

On the other hand, in step 12B, in the capture mode, the imaging device is calibrated by the same standard light source, therefore obtaining standard sensitivity gain of the capture mode. In the embodiment, the digital camera is aimed at the standard light source to perform calibrating, and as long as the shutter button of the digital camera is pressed fully down, it may enter the capture mode. Similarly, the sensitivity gain of the capture mode is the gain, generated by the automatic gain control (AGC) electric circuit of the digital camera, which corresponds to one of the predetermined sensitivities (e.g., ISO 100) under the predetermined luminosity value (or luminance value) of the standard light source.

The pixels sensed by the imaging device of the preview mode usually are a part, such as one-sixth, of that in the capture mode. Therefore, the sensitivity gain in the capture mode of the traditional digital camera is usually deduced by multiplying the sensitivity gain in the preview mode with the gain ratio of six. Accordingly, the exposure parameters obtained by light sensing in the preview mode may directly deduce the exposure parameters of the capture mode with the gain ratio of six.

Theoretically, the deduced exposure parameters of the capture mode will be the best exposure parameters. However, in practice, because of the difference among image sensors (e.g., charge coupled device (CCD)), optical lens, or other electronic/photoelectric elements, it may cause inconsistent sensitivity and thereby affect image quality.

To avoid this problem, in step 13 of the embodiment, the ratio of the standard sensitivity gain of the capture mode to the standard sensitivity gain of the preview mode is determined as the gain ratio of the digital camera. The gain ratio may be stored, for example, in the firmware of the digital camera (step 14). In general, the respective gain ratio of each imaging device (such as digital camera) may be different from each other because of the difference among the optical/electronic components. When the digital camera is operated each time, the stored gain ratio would be used to accurately deduce the exposure parameters of the capture mode according to the exposure parameters of the preview mode.

Figure 2:
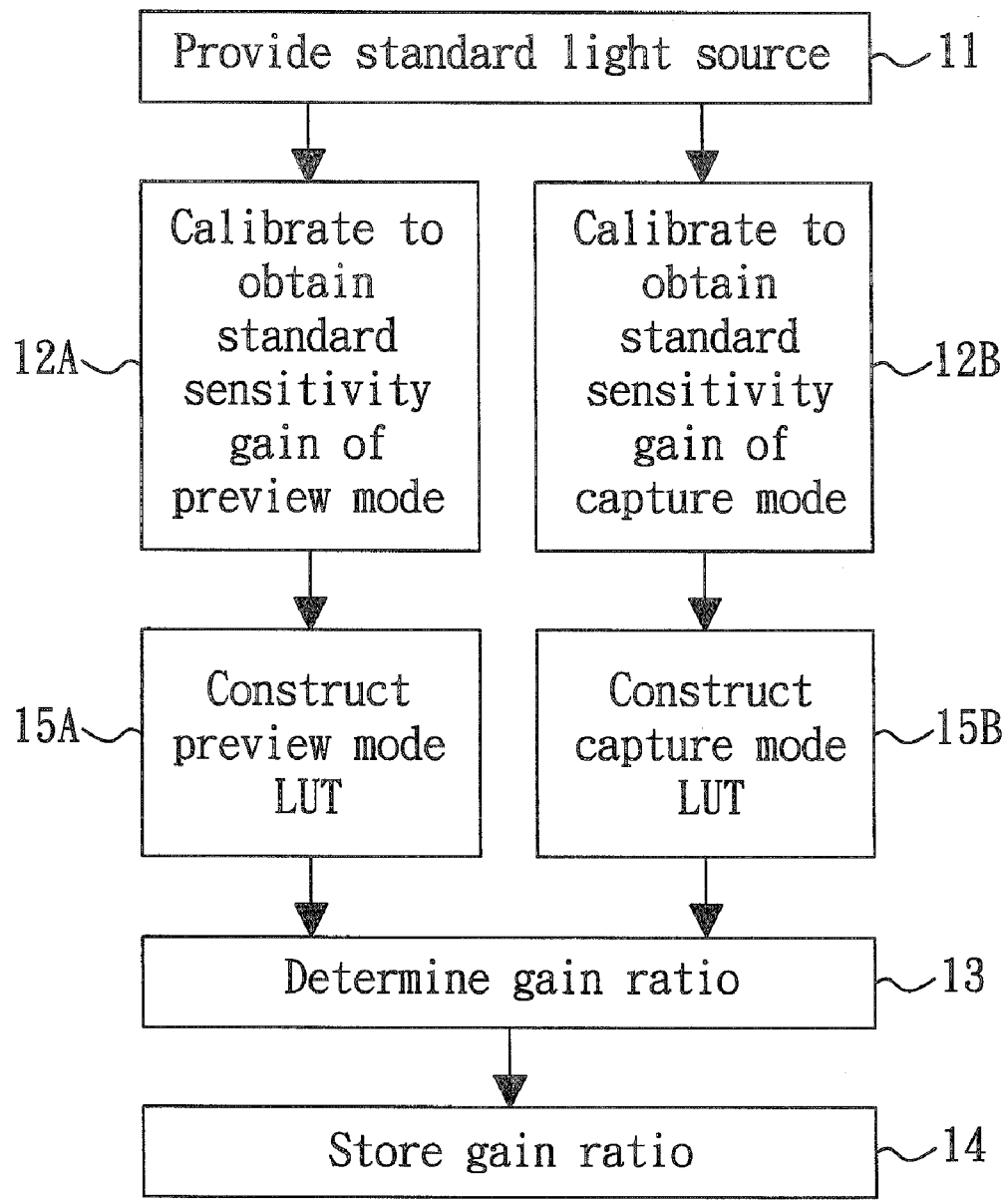
FIG. 2 is a flow diagram that illustrates a method of calibrating sensitivity gain according to another embodiment of the present invention.

FIG. 2 shows a flow diagram that illustrates a method of calibrating sensitivity gain according to another embodiment of the present invention. The steps of the present embodiment are similar to those of the previous embodiment (FIG.1) except that additional steps are executed after obtaining the sensitivity gain of the preview mode (step 13A) and the sensitivity gain of the capture mode (step 13B) respectively.

After step 13A, the automatic gain control (AGC) electric circuit continually produces a number of standard sensitivity gains of the preview mode, and a preview mode lookup table (LUT) is constructed (step 15A) to store the standard sensitivity gains of the preview mode. In addition, after step 13B, the automatic gain control (AGC) electric circuit also continually produces a number of standard sensitivity gains of the capture mode, and a capture mode lookup table (LUT) is constructed (step 15B) to store the standard sensitivity gains of the capture mode.

Although specific embodiments have been illustrated and described, it will be appreciated by those skilled in the art that various modifications may be made without departing from the scope of the present invention, which is intended to be limited solely by the appended claims.

What is claimed is:

1. A method of calibrating sensitivity gain, comprising:
using an automatic gain control (AGC) electric circuit to perform the steps of:
providing a standard light source;
calibrating an imaging device by the standard. light source in a preview mode, thereby obtaining a standard sensitivity gain of the preview mode;
calibrating the imaging device by the standard light source in a capture mode, thereby obtaining a standard sensitivity gain of the capture mode; and
determining a gain ratio of the standard sensitivity gain of the capture mode to the standard sensitivity gain of the preview mode;
wherein the gain ratio is used to deduce exposure parameters of the capture mode according to exposure parameters of the preview mode when operating the imaging device.

2. The method of claim 1, wherein the imaging device is a digital camera or a digital camcorder.

3. The method of claim 1, wherein the standard light source is a Commission internationale de l'eclairage (CIE) standard light source.

4. The method of claim 1, wherein pixels sensed by the imaging device in the preview mode are a part of pixels sensed in the capture mode.

5. The method of claim 4, wherein the pixels sensed by the imaging device in the preview mode are one-sixth of the pixels sensed in the capture mode.

6. The method. of claim 1, after determining the gain ratio, further comprising a step of storing the gain ratio in the imaging device.

7. The method of claim 1, in the calibration steps of the preview mode and the capture mode, a calibration parameter of the imaging device is a predetermined speed value (Sv), and the standard light source has a predetermined luminance value (Bv), accordingly, the imaging device has a fixed exposure value (Ev), conforming to Ev=Bv+Sv.

8. The method of claim 7, wherein the exposure parameters of the preview mode and of the capture mode comprise aperture value (Av) and time value (Tv), which conform to Ev=Av+Tv.

9. The method of claim 1, wherein the standard sensitivity gain of the preview mode and the standard sensitivity gain of the capture mode obtained in the calibrating steps are generated by an automatic gain control (AGC) unit of the imaging device.

10. The method of claim 1, wherein a plurality of the standard sensitivity gains are obtained in the calibrating step of the preview mode.

11. The method of claim 10, further comprising constructing a preview mode lookup table (LUT) to store the plurality of standard sensitivity gains in the preview mode.

12. The method of claim 1, wherein a plurality of the standard sensitivity gains are obtained in the calibrating step of the capture mode.

13. The method of claim 12, further comprising constructing a capture mode lookup table (LUT) to store the plurality of standard sensitivity gains in the capture mode.

14. An imaging system, comprising:
an automatic gain control (AGC) electric circuit configured to generate a standard sensitivity gain of a preview mode, and a standard sensitivity gain of a capture mode, wherein the standard sensitivity gain of the preview mode is generated by subject to calibration by a standard light source in the preview mode, and the standard sensitivity gain of the capture mode is generated by subject to calibration by the standard light source in the capture mode;
wherein the AGC electric circuit determines a gain ratio of the standard. sensitivity gain of the capture mode to the standard sensitivity gain of the preview mode; and
wherein the gain ratio is used. to deduce exposure parameters of the capture mode according to exposure parameters of the preview mode.

15. The system of claim 14, wherein the standard light source is a Commission internationale de l'eclairage (CIE) standard light source.

16. The system of claim 14, wherein the gain ratio is further stored.

17. The system of claim 14, wherein the AGC electric circuit in the calibration of the preview mode and the capture mode uses a calibration parameter, which is a predetermined speed value (Sv), and the standard light source has a predetermined luminance value (Bv), thereby obtaining a fixed exposure value (Ev) conforming to Ev=Bv+Sv.

18. The system of claim , wherein the exposure parameters of the preview mode and the capture mode comprise aperture value (Av) and time value (Tv), which conform to Ev=Av+Tv.

19. The system of claim 14, wherein the AGC electric circuit generates a plurality of the standard sensitivity gains in the calibration of the preview mode, and constructs a preview mode lookup table (LUT) to store the plurality of standard sensitivity gains in the preview mode.

20. The system of claim 14, wherein the AGC electric circuit generates a plurality of the standard sensitivity gains in the calibration of the capture mode, and constructs a capture mode lookup table (LUT) to store the plurality of standard sensitivity gains in the capture mode.

* * * * *